United States Patent
Suzuki et al.

(10) Patent No.: US 6,575,583 B2
(45) Date of Patent: Jun. 10, 2003

(54) DISPLAY DEVICE FOR VEHICLES

(75) Inventors: Koji Suzuki, Saitama (JP); Koji Kano, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/814,829

(22) Filed: Mar. 23, 2001

(65) Prior Publication Data

US 2001/0024361 A1 Sep. 27, 2001

(30) Foreign Application Priority Data

Mar. 23, 2000 (JP) .................................. 2000-082076

(51) Int. Cl.[7] .............................................. G01D 11/28
(52) U.S. Cl. ........................ 362/23; 362/489; 362/561
(58) Field of Search ............................ 362/23, 561, 489

(56) References Cited

U.S. PATENT DOCUMENTS

| | | | |
|---|---|---|---|
| 5,818,553 A | 10/1998 | Koenck et al. | 349/61 |
| 5,893,637 A * | 4/1999 | Mizuno | 362/23 |
| 5,949,346 A * | 9/1999 | Suzuki et al. | 116/286 |
| 6,120,159 A * | 9/2000 | Inoguchi et al. | 362/29 |
| 6,224,222 B1 * | 5/2001 | Inoguchi et al. | 362/29 |
| 6,302,551 B1 * | 10/2001 | Matumoto | 116/286 |

FOREIGN PATENT DOCUMENTS

| | | |
|---|---|---|
| DE | 36 87 701 T2 | 7/1988 |
| EP | 0 115 575 | 8/1984 |
| JP | 62 125329 | 6/1987 |
| JP | 2582395 | 7/1998 |

* cited by examiner

Primary Examiner—Thomas M. Sember
Assistant Examiner—John Amarantides
(74) Attorney, Agent, or Firm—Birch, Stewart, Kolasch & Birch, LLP

(57) ABSTRACT

The present invention accurately detects the illumination on the surface of an instrument panel, to thereby enable an easy view of the instruments. A meter unit includes an instrument panel in which a speedometer and other instruments are arranged, and an information display panel for displaying various information by characters and other graphic symbols. The instrument panel has a translucent dial, on the back side of which illuminating lamps are installed. A light sensor is located in the speedometer adjacent to indicators which display various kinds of information. Since the actual illumination on the instrument panel can be accurately detected in accordance with a result of detection by the light sensor, the luminance of the illuminating lamp can be controlled on the basis of the result of the detection, to thereby provide proper illumination for the rider's easy view of the instruments.

14 Claims, 4 Drawing Sheets

DISPLAY DEVICE FOR VEHICLES

BACKGROUND OF THE INVENTION

1. Field of the Invention

The present invention relates to a display device for vehicles, and more particularly, to a display device equipped with a light control device capable of adjusting the luminance of a light source according to the brightness of the surroundings.

2. Description of the Background Art

In an automobile or a motorcycle, a display device which displays vehicle speed, engine speed, etc. is provided with an illuminating system for illuminating a display surface, that is, an instrument panel surface. Some illuminating systems are fitted with a light control device which can detect the external light by a sensor and adjust the luminance of the light source in accordance with the detected output. However, it is likely that sensor characteristics will be deteriorated by heat, ultraviolet rays or infrared rays of the external light, resulting in inaccurate light control. To cope with this shortcoming, therefore, there has been proposed by Japanese Utility Model Publication No. 2582395 a head-up type display device which guides the external light to the sensor by a light guide body having a characteristic to cut the ultraviolet rays and infrared rays.

Generally, the sensor and the light guide member for the light control device are located in a place, for example on an instrument panel directly exposed to the external light, or, in a motorcycle, in the vicinity of a windshield supporting portion. Therefore, the display screen of the display device is sometimes shaded by the instrument panel or the light is reduced by a visor mounted above the display device even when the surroundings are bright. In such a case, if the luminance is adjusted according to the detected output of the sensor, the display screen is not necessarily bright to the rider (or driver).

SUMMARY OF THE INVENTION

It is therefore an object of the present invention to provide a display device for vehicles which is capable of accurately detecting the easy-to-view luminance on the display screen, and controlling the light according to a result of the detection.

To attain the above-described object, the display device of this invention has a light control means for controlling the illumination on the display surface according to the illumination detected by the light sensor.

The display device includes a case, an instrument panel housed in the case, and a lighting means for illuminating the instrument panel. The light sensor is located on the surface of the instrument panel. The light sensor for light control is disposed on the surface of the instrument panel for practical visual recognition by the rider (or driver). Because of the provision of the light sensor, the rider (or driver) can see results of measurements of the vehicle speed and others at an easier-to-recognize illumination.

The lighting means is disposed on the back side of the instrument panel, and a light shielding means is provided for shielding the light of the lighting means coming from behind the light sensor. The light from the lighting means can therefore be prevented from directly entering the light sensor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 5:
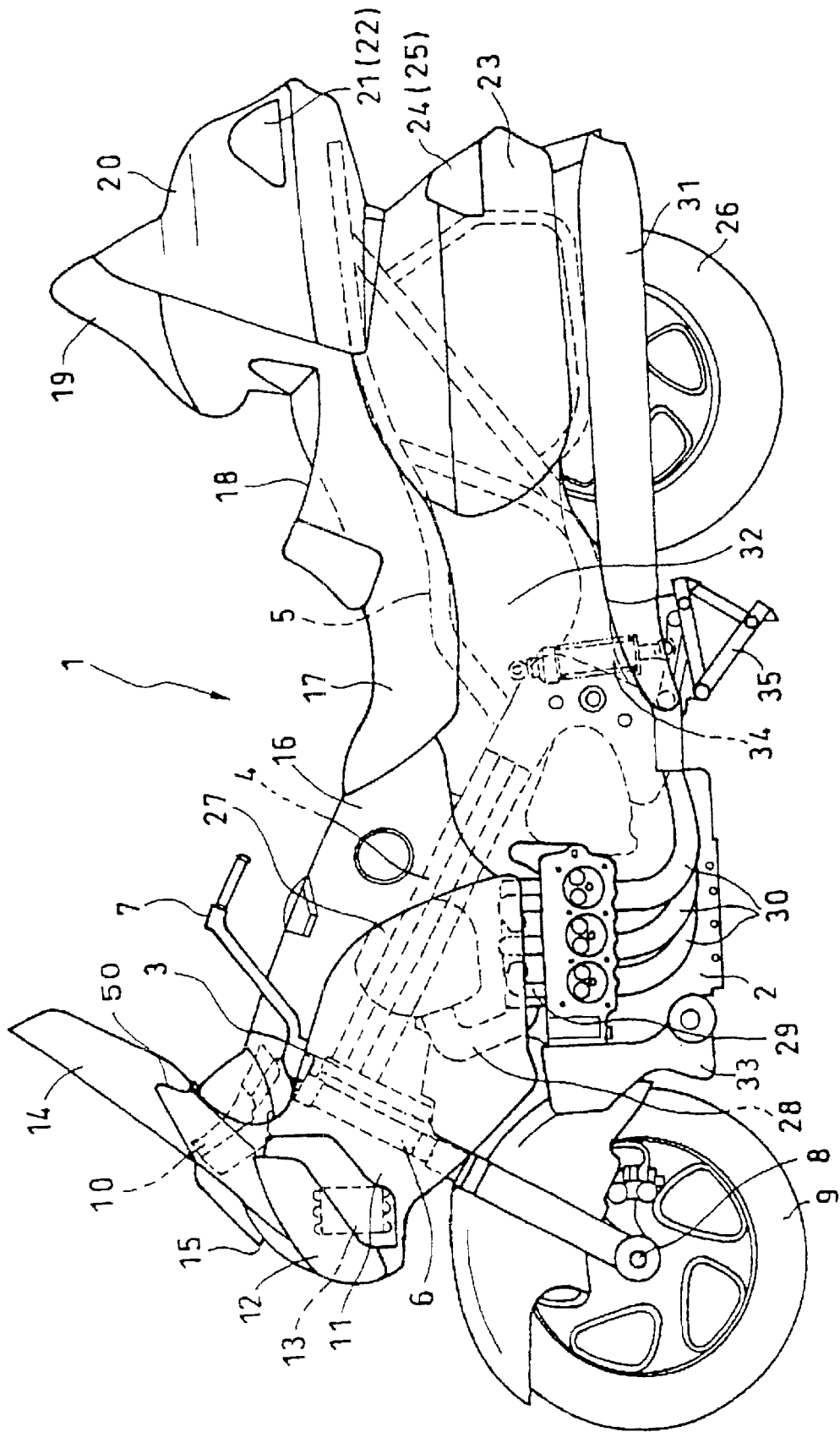
FIG. 5 is a side view of a motorcycle mounted with a display device according to one embodiment of this invention.

A preferred embodiment of a display device for vehicles according to this invention will now be described with reference to the accompanying drawings. FIG. 5 is a side view showing the external appearance of a motorcycle mounted with a display device according to the one preferred embodiment of this invention. In the drawing, the motorcycle 1 (hereinafter referred to as the vehicle) is mounted with a horizontal opposed six-cylinder engine 2.

The frame structure of the vehicle is comprised of a twin-frame type main frame 4 which is bifurcated to right and left frames extending rearwardly from a steering head 3, and a rear frame 5 connected to the rear end of the main frame 4. A front fork 6 is composed of two pipes arranged on the right and left sides in the direction of travel, and is installed to the steering head 3. The front fork 6 is thus rotatable in the steering direction.

A handlebar 7 is secured on the upper part of the steering head 3, on the top bridge. A front wheel axle 8 is mounted at the lower end of the front fork 6. A front wheel 9 is rotatably supported on the front wheel axle 8.

The display device is mounted forwardly of the handlebar 7. The display device includes a meter unit 10, including a display panel and a control unit. A visor 50 is provided for the meter unit 10 for protecting the meter unit 10 from the external light. The visor 50 is for shading the upper part of the display surface of the meter unit 10. To shade the lower display surface, a non-illustrated second visor is further provided. A display surface illuminating system is installed on the meter unit 10, and a light control device is installed for adjusting the luminance of the illuminating system. The visor and light control device will be described in detail later.

A lens surface (clear lens) 12 for the lighting device is attached at the front of a front fairing (cowling) 11 which covers the front part of the vehicle 1. A ballast 13 is housed inside of the front cowling 11 for a discharge lamp used as the lighting device. A windshield 14 is installed above the front cowling 11, and an air inlet 15 is formed near the mounting portion of the windshield 14.

A fuel tank 16 is mounted on the main frame 4. A rider's seat 17 and a pillion seat 18 are arranged to the rear of the fuel tank 16. The rider's seat 17 and the pillion seat 18 are mounted on the rear frame 5. The pillion seat 18 is formed unitarily with the rider's seat 17, and has a backrest 19. A rear trunk 20 is provided behind the backrest 19. A rear stop light 21 and a blinker light 22 are also mounted behind the rear trunk 20. Side trunks 23 are mounted beneath the rear trunk 20 on the right and left of the rear wheel 26. A set of rear stop lights 24 and blinker lights 25 are mounted at the rear of the side trunks 23.

An air cleaner 27 is mounted forwardly of the lower part of the fuel tank 16. An intake manifold 29 extends from a throttle body 28 mounted in front of the air cleaner 27. The intake manifold 29 is connected to each of three cylinders oppositely arranged on both the right and left sides of the vehicle. A fuel injection system (not shown) is located upstream of each of these cylinders. An exhaust manifold 30 is installed from the engine 2 toward the rear. The exhaust manifold 30 is connected to a muffler 31.

Both sides under the rider's seat 17 are covered with side covers 32, and a front lower cowling 33 is located at the front of the engine 2. A rear cushion 34 is disposed under the rider's seat 17. The rear cushion 34 is connected to a hydraulic unit (not shown) which is capable of electrically adjusting the spring force to provide the initial weight application to the suspension according to the rider's weight. The vehicle 1 can be supported up on a stand 35.

Figure 1:
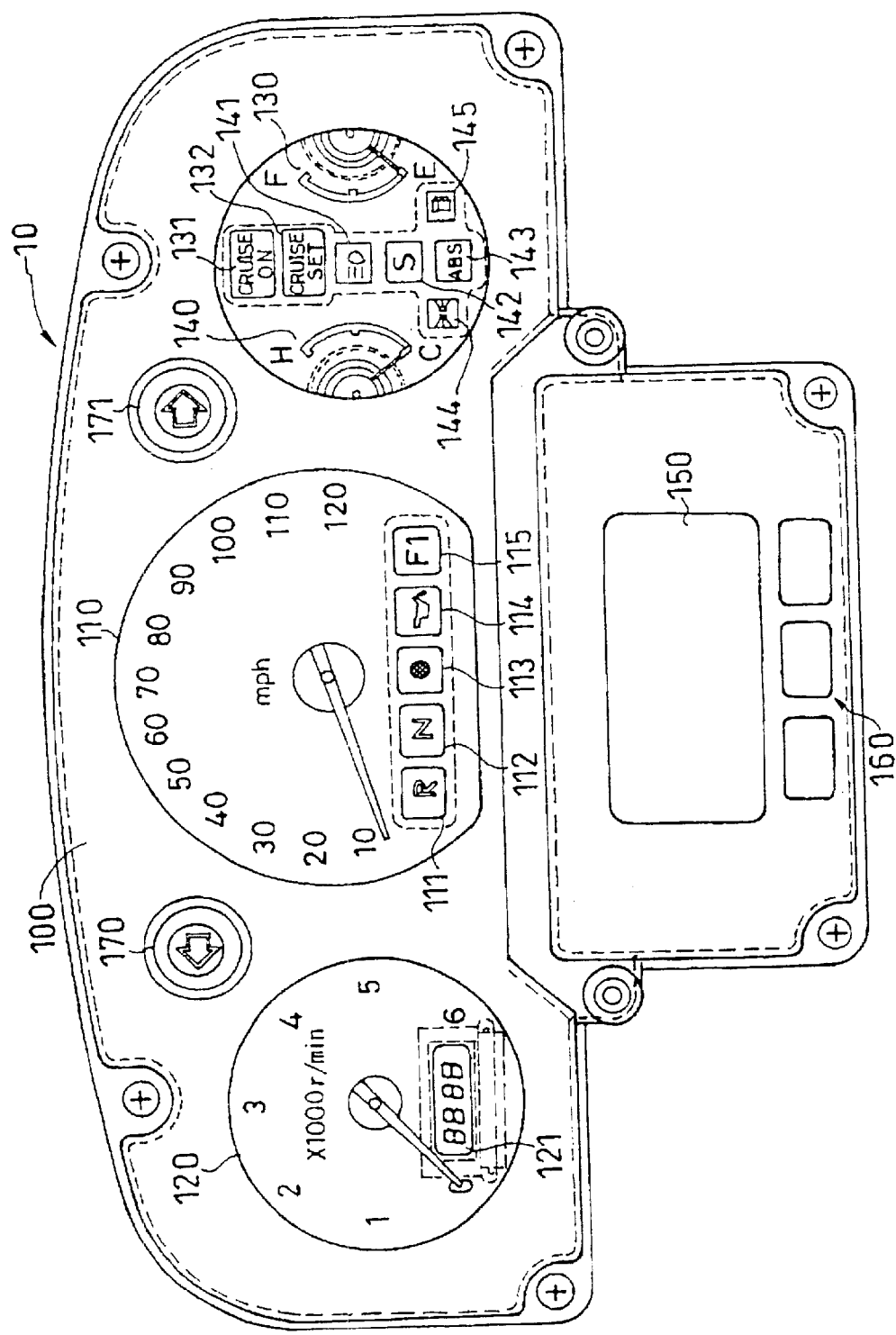
FIG. 1 is a front view of a meter unit according to one embodiment of this invention.

Next, the panel face of the meter unit 10 will be explained. FIG. 1 is a plan view of the meter unit as viewed from the rider's seat side of the motorcycle. In FIG. 1, the speedometer 110 is located at the central part of the instrument panel 100 mounted above the meter unit 10. Mounted on the left is a tachometer 120, and mounted on the right are a fuel gauge 130 and a water temperature gauge 140. An information display panel 150 is provided beneath the instrument panel 100 which displays information, characters, and other graphic symbols displaying information on the selection of radio and wireless communication stations and sound volume, and its control switch 160.

A gearshift REVERSE display lamp 111, a NEUTRAL display lamp 112, an oil indicator 114, and a fuel injection (FI) warning light 115 are disposed in the speedometer 110. A light sensor 113 for light control is installed between the NEUTRAL display lamp 112 and the oil indicator 114. Between the fuel gauge 130 and the water temperature gauge 140 are installed vertically in one row an AUTO CRUISE indicating lamp 131, an AUTO CRUISE SET indicating lamp 132, a HIGH-BEAM indicating lamp 141, a SIDE STAND UP warning light 142, and an ABS (anti-lock brake system) warning light 143.

A light on-off indicator 144 is mounted on the left side of the ABS warning light 143, and a fuel empty indicator 145 is mounted on the right side of the ABS warning light 143. A clock 121 is mounted below the tachometer 120. Blinker indicators 170 and 171 are provided in the upper right and left of the speedometer 110.

Figure 2:
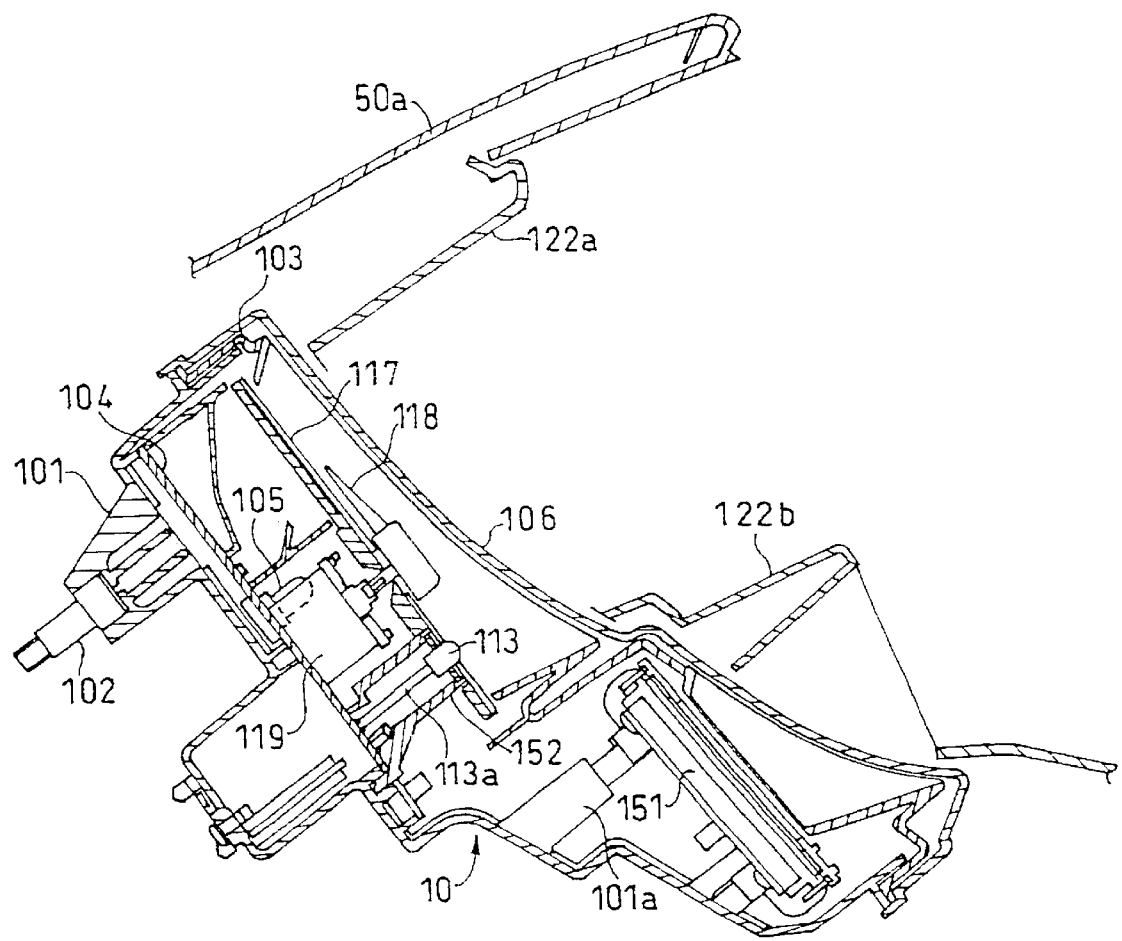
FIG. 2 is a side sectional view of the meter unit.

FIG. 2 is a sectional view showing the structure of the meter unit 10. In the drawing, the case of the meter unit 10 includes a lower case 101, an upper case 103, a bottom plate 104, and a lens 106. On the lower case 101 is installed a bolt 102, by which the meter unit 10 is secured to the front cowling 11. The upper case 103 is mounted at the front of the lower case 101, and the lower case 101 is fitted with the case bottom plate 104.

A translucent dial 117 is installed between the case bottom plate 104 and the upper case 103 which serves as the display surface of the instrument panel 100. A liquid crystal panel 151 is located obliquely below the dial 117 as the body of the information display panel 150 which is supported by the stem 101a raised from the lower case 101. As illustrated, between the dial 117 and the liquid crystal panel 151 there is a difference in level. The surface of the liquid crystal panel 151 is set in a position closer to the rider's eyes.

The shaft of the pointer 118 is installed through the dial 117, and the light sensor 113 is installed with its forward end exposed on the dial 117. Also installed are a driving unit 119 of the pointer 118, a lead (leg portion 113a of the light sensor 113), and a lamp 105 applying the light translucently from behind the dial 117 to illuminate characters or graphic symbols. Also provided are a lead 113a, and light shield identified as a plate 152 for surrounding and covering the lower part of the head of the light sensor 113 to thereby prevent the direct incidence of light from the lamp 105 to the light sensor 113. Because of the use of this plate 152, the sensor 113 can accurately adjust the external light without an influence of the light of the lamp 105.

A photoelectric transducer element such as a phototransistor is used as the light sensor 113, which outputs the luminance to the later-described light control device, that is, a signal corresponding to the light intensity over the dial 117. The light control device functions to determine the luminance on the basis of the characteristic and output of the light sensor, then controlling the luminance of the lamp 105 to a predetermined value. An acrylic resin lens 106 is used at the front of the meter unit 10 to protect each component. The lens 106 is so formed as to cover both the instrument panel 100 and the information display panel all together. The use of this lens 106 can simplify the lens molding and assembling processes more efficiently than separate lenses covering the instrument panel 100 and the information display panel 150.

Figure 3:
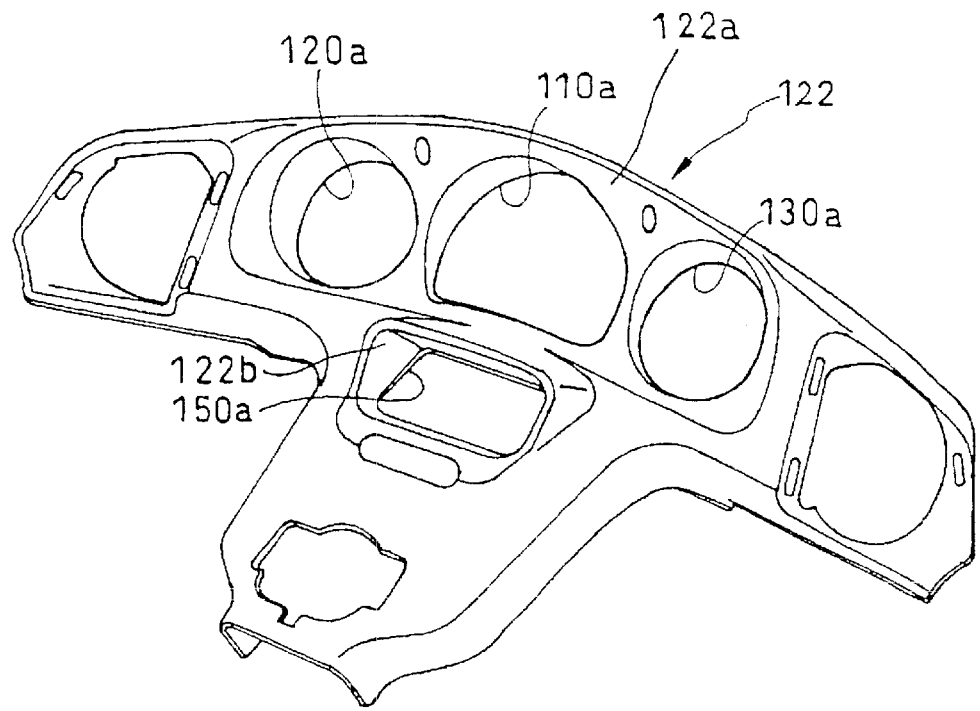
FIG. 3 is a perspective view of a panel cover.

A panel cover 122 is mounted at the front of the meter unit 10. For the panel cover 122, refer to the perspective view of FIG. 3. The panel cover 122 is formed to cover both the meter unit 10 and the right and left speaker panels (not shown) as one body. Holes 120a and 110a formed in the panel cover 122 align with the display position of the tachometer 120 and the speedometer 110 respectively. The hole 130a is formed to correspond to the display position of the fuel gauge 130 and the water temperature gauge 140. Furthermore, the hole 150a is so formed as to correspond to the display position of the information display panel 150.

The upper overhang section 122a of the panel cover 122 forms a part of the visor 50 for the instrument panel 100, while the lower overhang section 122b forms a visor for the information display panel 150. The top end of the overhang section 122a is covered with the body 50a of the visor 50 extending upwardly toward the rider. The lower part of the visor body 50a is secured, together with the meter unit 10, to a non-illustrated stay covered with the front cowling 11.

Figure 4:
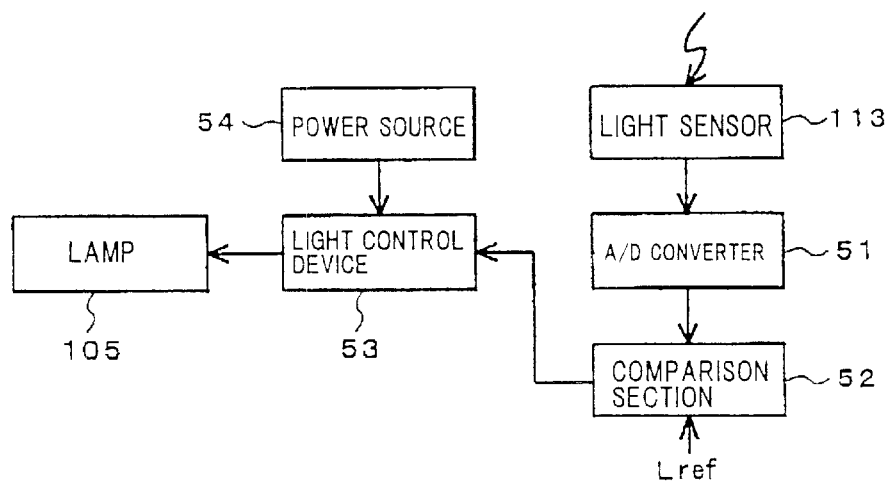
FIG. 4 is a block diagram showing a major portion of the light control device.

FIG. 4 is a block diagram showing the structure of a major portion of the light adjusting device. In the drawing, the light sensor 113 produces a light current corresponding to the intensity of the incident light. The light current is converted into a digital signal by an A/D converter 51. At the comparison section 52, the digital signal is compared with the reference illumination value Lref. The comparison section 52 outputs, to the light control device 53, an Up signal when the value of the digital signal thus compared is less than the reference illumination value Lref, and a Dn signal when the value of the digital signal is greater than the reference illumination value Lref. The reference illumination value Lref has a dead zone for stabilization of operation. The light control device 53 responds to a signal outputted from the comparison section 52. In the case of the Up signal, the current to be supplied from the power source 54 to the lamp 105 is increased. Conversely, in the case of the Dn signal, the current to be supplied from the power source 54 to the lamp 105 is decreased.

In the present embodiment, the illumination on the display surface of the instrument panel 100 where information are practically displayed is detected, to thereby enable controlling the luminance of the light source to a reference value.

According to the present invention, results of measurements of vehicle speed, engine speed, etc. are displayed, and at this time, the illumination on the surface of the instrument panel is measured to thereby provide the proper illumination for the driver's direct view to the display. Furthermore, since the light sensor is housed inside of the case, it is possible to protect the characteristics of the light sensor from deterioration likely to be caused by infrared and ultraviolet rays included in the external light.

Furthermore, it is possible to accurately detect and control the illumination in relation to a change in the external light without a direct influence of the light of the lighting means which illuminates the instrument panel.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A display device for a vehicle comprising:
   a case;
   an instrument panel housed in said case;
   a light source for illuminating said instrument panel, said light source being located on a back side of said instrument panel;
   a light sensor mounted on a surface of said instrument panel;
   a light control circuit for controlling an amount of power provided to said light source based on an illumination amount detected by said light sensor to thereby control an illumination intensity of said light source in lighting said instrument panel; and
   a light shield located on said back side of said instrument panel, said light shield shielding light from said light source coming in from behind said light sensor.

2. The display device according to claim 1, wherein said light shield at least partially surrounds a lower portion of said light sensor.

3. The display device according to claim 1, wherein said light sensor extends partially through an aperture in said surface of said instrument panel.

4. The display device according to claim 3, wherein said aperture extends through a face of a gauge on said instrument panel.

5. The display device according to claim 4, wherein said gauge is a speedometer.

6. The display device according to claim 1, further comprising a lens covering said instrument panel.

7. The display device according to claim 1, wherein an upper portion of said light sensor extends partially through an aperture in said surface of said instrument panel and a lower portion of said light sensor is shielded by said light shield.

8. The display device according to claim 7, wherein said light sensor is located in a central, lower portion of a speedometer of said instrument panel.

9. A display device for a vehicle comprising:
   a case;
   an instrument panel housed in said case;
   a light source provided in said case, said light source being located on a back side of a display surface of said instrument panel, for illuminating said back side of said display surface of said instrument panel;
   a light sensor extending partially through an aperture in said display surface of said instrument panel;
   a light control circuit for controlling an amount of power provided to said light source based on an illumination amount detected by said light sensor to thereby control an illumination intensity of said light source in lighting said instrument panel; and
   a light shield located on said back side of said display surface of said instrument panel, said light shield shielding light from said light source coming in from behind said light sensor.

10. The display device according to claim 9, wherein said light shield at least partially surrounds a lower portion of said light sensor.

11. The display device according to claim 9, wherein said aperture extends through a face of a gauge.

12. The display device according to claim 11, wherein said gauge is a speedometer.

13. The display device according to claim 9, further comprising a lens covering said instrument panel.

14. The display device according to claim 9, wherein said aperture is located in a central, lower portion of a speedometer of said instrument panel.

* * * * *